(12) United States Patent
Ralston et al.

(10) Patent No.: US 11,915,376 B2
(45) Date of Patent: Feb. 27, 2024

(54) WEARABLE ASSISTED PERCEPTION MODULE FOR NAVIGATION AND COMMUNICATION IN HAZARDOUS ENVIRONMENTS

(71) Applicant: Qwake Technologies, Inc., San Francisco, CA (US)

(72) Inventors: Michael E. Ralston, Mountain View, CA (US); Sam J. Cossman, San Francisco, CA (US); Omer Haciomeroglu, San Francisco, CA (US); John Davis Long, II, New York, NY (US)

(73) Assignee: Qwake Technologies, Inc., San Francisco, CA (US)

( * ) Notice: Subject to any disclaimer, the term of this patent is extended or adjusted under 35 U.S.C. 154(b) by 355 days.

(21) Appl. No.: 17/006,741

(22) Filed: Aug. 28, 2020

(65) Prior Publication Data

US 2021/0059344 A1    Mar. 4, 2021

Related U.S. Application Data

(60) Provisional application No. 62/892,926, filed on Aug. 28, 2019.

(51) Int. Cl.
*G06T 19/00* (2011.01)
*A42B 3/04* (2006.01)
(Continued)

(52) U.S. Cl.
CPC ............ *G06T 19/006* (2013.01); *A42B 3/042* (2013.01); *G01J 5/047* (2013.01);
(Continued)

(58) Field of Classification Search
None
See application file for complete search history.

(56) References Cited

U.S. PATENT DOCUMENTS

| 5,778,092 A | 7/1998 | MacLeod |
| 6,195,467 B1 | 2/2001 | Asimopoulos |
| (Continued) | | |

FOREIGN PATENT DOCUMENTS

| EP | 1168033 A1 | 1/2002 |
| EP | 1659890 B1 | 1/2009 |
| (Continued) | | |

OTHER PUBLICATIONS

Patent Cooperation Treaty: International Search Report and Written Opinion for PCT/US2020/048636 dated Nov. 24, 2020; 20 pages.
(Continued)

*Primary Examiner* — Jwalant Amin
(74) *Attorney, Agent, or Firm* — Marton Ribera Schumann & Chang LLP; Chien-Ju Alice Chuang

(57) ABSTRACT

An assisted perception (AP) module comprises an attachment mechanism to attach the AP module to a helmet, and a housing to integrate modular components of the AP module. The housing comprises a front portion and side portion, the front portion located over an eye of the user. The modular components include sensors to collect information about an environment as sensor data, and processors located in the side portion. The processors execute one or more assisted perception engines that process the sensor data from the sensors into enhanced characterization data. Output devices electronically communicate the enhanced characterization data to a user, wherein at least one of the output devices protrudes from the front portion of the housing in front of an eye of the user.

24 Claims, 11 Drawing Sheets

(51) Int. Cl.
| | |
|---|---|
| *G02B 27/01* | (2006.01) |
| *G01J 5/04* | (2006.01) |
| *G06F 3/01* | (2006.01) |
| *G01J 5/00* | (2022.01) |

(52) U.S. Cl.
CPC ......... *G02B 27/0172* (2013.01); *G06F 3/013* (2013.01); *G01J 2005/0077* (2013.01); *G02B 2027/0138* (2013.01); *G02B 2027/0187* (2013.01)

(56) References Cited

U.S. PATENT DOCUMENTS

| | | |
|---|---|---|
| 6,611,618 B1 | 8/2003 | Peli |
| 6,891,966 B2 | 5/2005 | Chen |
| 6,898,559 B2 | 5/2005 | Saitta |
| 6,909,539 B2 | 6/2005 | Korniski |
| 7,085,401 B2 | 8/2006 | Averbuch |
| 7,190,832 B2 | 3/2007 | Frost |
| 7,369,174 B2 | 5/2008 | Olita |
| 7,377,835 B2 | 5/2008 | Parkulo |
| 7,430,303 B2 | 9/2008 | Sefcik |
| 7,460,304 B1 | 12/2008 | Epstein |
| 7,598,856 B1 | 10/2009 | Nick |
| 8,054,170 B1 | 11/2011 | Brandt |
| 8,358,307 B2 | 1/2013 | Shiomi |
| 8,463,006 B2 | 6/2013 | Prokoski |
| 8,836,793 B1 | 9/2014 | Kriesel |
| 9,177,204 B1 | 11/2015 | Tiana |
| 9,498,013 B2 | 11/2016 | Handshaw |
| 9,728,006 B2 | 8/2017 | Varga |
| 9,729,767 B2 | 8/2017 | Longbotham |
| 9,875,430 B1 | 1/2018 | Keisler |
| 9,918,023 B2 | 3/2018 | Simolon |
| 9,924,116 B2 | 3/2018 | Chahine |
| 9,930,324 B2 | 3/2018 | Chahine |
| 9,995,936 B1 | 6/2018 | Macannuco |
| 9,998,687 B2 | 6/2018 | Lavoie |
| 10,033,944 B2 | 7/2018 | Högasten |
| 10,042,164 B2 | 8/2018 | Kuutti |
| 10,044,946 B2 | 8/2018 | Strandemar |
| 10,089,547 B2 | 10/2018 | Shemesh |
| 10,091,439 B2 | 10/2018 | Högasten |
| 10,122,944 B2 | 11/2018 | Nussmeier |
| 10,182,195 B2 | 1/2019 | Kostrzewa |
| 10,192,540 B2 | 1/2019 | Clarke |
| 10,230,909 B2 | 3/2019 | Kostrzewa |
| 10,230,910 B2 | 3/2019 | Boulanger |
| 10,244,190 B2 | 3/2019 | Boulanger |
| 10,249,032 B2 | 4/2019 | Strandemar |
| 10,250,822 B2 | 4/2019 | Terre |
| 10,338,800 B2 | 7/2019 | Rivers |
| 10,417,497 B1 | 9/2019 | Cossman |
| 10,425,603 B2 | 9/2019 | Kostrzewa |
| 10,436,887 B2 | 10/2019 | Stokes |
| 10,598,550 B2 | 3/2020 | Christel |
| 10,623,667 B2 | 4/2020 | Högasten |
| 10,803,553 B2 | 10/2020 | Foi |
| 10,909,660 B2 | 2/2021 | Egiazarian |
| 10,937,140 B2 | 3/2021 | Janssens |
| 10,962,420 B2 | 3/2021 | Simolon |
| 10,983,206 B2 | 4/2021 | Hawker |
| 10,986,288 B2 | 4/2021 | Kostrzewa |
| 10,986,338 B2 | 4/2021 | DeMuynck |
| 10,996,542 B2 | 5/2021 | Kostrzewa |
| 11,010,878 B2 | 5/2021 | Högasten |
| 11,012,648 B2 | 5/2021 | Kostrzewa |
| 11,029,211 B2 | 6/2021 | Frank |
| 2003/0122958 A1 | 7/2003 | Olita |
| 2003/0190090 A1 | 10/2003 | Beeman |
| 2006/0023966 A1 | 2/2006 | Vining |
| 2006/0048286 A1 | 3/2006 | Donato |
| 2007/0257934 A1 | 11/2007 | Doermann |
| 2008/0092043 A1 | 4/2008 | Trethewey |
| 2008/0146334 A1 | 6/2008 | Kil |
| 2011/0135156 A1 | 6/2011 | Chen |
| 2011/0239354 A1 | 10/2011 | Celona |
| 2011/0262053 A1 | 10/2011 | Strandemar |
| 2013/0050432 A1 | 2/2013 | Perez |
| 2013/0307875 A1 | 11/2013 | Anderson |
| 2015/0025917 A1 | 1/2015 | Stempora |
| 2015/0067513 A1 | 3/2015 | Zambetti |
| 2015/0163345 A1 | 6/2015 | Cornaby |
| 2015/0172545 A1 | 6/2015 | Szabo |
| 2015/0202962 A1 | 7/2015 | Habashima |
| 2015/0244946 A1 | 8/2015 | Agaian |
| 2015/0302654 A1 | 10/2015 | Arbouzov |
| 2015/0324989 A1 | 11/2015 | Smith |
| 2015/0334315 A1 | 11/2015 | Teich |
| 2015/0338915 A1 | 11/2015 | Publicover |
| 2015/0339570 A1 | 11/2015 | Scheffler |
| 2016/0097857 A1 | 4/2016 | Gokay |
| 2016/0187969 A1 | 6/2016 | Larsen |
| 2016/0220324 A1 * | 8/2016 | Tesar .................... A61B 90/25 |
| 2016/0260261 A1 | 9/2016 | Hsu |
| 2016/0295208 A1 | 10/2016 | Beall |
| 2016/0350906 A1 | 12/2016 | Meier |
| 2016/0360382 A1 | 12/2016 | Gross |
| 2017/0061663 A1 | 3/2017 | Johnson |
| 2017/0123211 A1 | 5/2017 | Lavoie |
| 2017/0192091 A1 | 7/2017 | Felix |
| 2017/0224990 A1 | 8/2017 | Goldwasser |
| 2017/0251985 A1 | 9/2017 | Howard |
| 2018/0012470 A1 | 1/2018 | Kritzler |
| 2018/0029534 A1 | 2/2018 | De Wind |
| 2018/0165978 A1 | 6/2018 | Wood |
| 2018/0189957 A1 | 7/2018 | Sanchez Bermudez |
| 2018/0204364 A1 | 7/2018 | Hoffman |
| 2018/0205893 A1 | 7/2018 | Simolon |
| 2018/0241929 A1 | 8/2018 | Bouzaraa |
| 2018/0266886 A1 | 9/2018 | Frank |
| 2018/0283953 A1 | 10/2018 | Frank |
| 2018/0330474 A1 | 11/2018 | Mehta |
| 2019/0141261 A1 | 5/2019 | Högasten |
| 2019/0228513 A1 | 7/2019 | Strandemar |
| 2019/0231261 A1 | 8/2019 | Tzvieli |
| 2019/0325566 A1 | 10/2019 | Högasten |
| 2019/0335118 A1 | 10/2019 | Simolon |
| 2019/0342480 A1 | 11/2019 | Kostrzewa |
| 2019/0359300 A1 | 11/2019 | Johnson |
| 2020/0005440 A1 | 1/2020 | Sanchez-Monge |
| 2020/0090308 A1 | 3/2020 | Lin |
| 2020/0141807 A1 | 5/2020 | Poirier |
| 2020/0147418 A1 | 5/2020 | Haciomeroglu |
| 2020/0193652 A1 | 6/2020 | Hoffman |
| 2020/0327646 A1 | 10/2020 | Xu |
| 2020/0349354 A1 | 11/2020 | Cossman |
| 2020/0401143 A1 | 12/2020 | Johnson |
| 2021/0080260 A1 | 3/2021 | Tremblay |

FOREIGN PATENT DOCUMENTS

| | | | |
|---|---|---|---|
| WO | WO-9402043 A1 * | 2/1994 | ............. A42B 3/044 |
| WO | 2017/130184 A1 | 8/2017 | |
| WO | 2018/167771 A1 | 9/2018 | |

OTHER PUBLICATIONS

Bretschneider et al., "Head Mounted Displays for Fire Fighters" 3rd International Forum on Applied Wearable Computing 2006; 15 pages.

Chen, "Reducing Cognitive Load in Mobile Learning: Activity-centered Perspectives" Published in International Conference on Networking and Digital Society; DOI: 10.1109/ICNDS.2010.5479459; pp. 504-507 (2010).

Fan, et al., "Reducing Cognitive Overload by Meta-Learning Assisted Algorithm Selection" Published in 5th IEEE International Conference on Cognitive Informatics; DOI: 10.1109/COGINF.2006.365686; pp. 120-125 (2006).

Gimel'Farb Part 3: Image Processing, Digital Images and Intensity Histograms; COMPSCI 373 Computer Graphics and Image Pro-

(56) References Cited

OTHER PUBLICATIONS cessing; University of Auckland, Auckland, NZ; Date unknown 57 pages.

Haciomeroglu, "C-thru smoke diving helmet" Jan. 8, 2013; 15 pages; behance.com <http://ww.behance.net/gallery/6579685/C-Thru-Smoke-Diving-Helmet>.

Haciomeroglu, "C-thru smoke diving helmet" Jan. 8, 2013, 14 pages; coroflot.com <https://www.coroflot.com/OmerHaciomeroglu/C-Thru-smoke-Diving-Helmet>.

Khan et al., "Tracking Visual and Infrared Objects using Joint Riemannian Manifold Appearance and Affine Shaping Modeling" Dept. of Signals and Systems, Chalmers University of Technology, Gothenburg, 41296, Sweden; IEEE International Conference on Computer Vision Workshop (2011); pp. 1847-1854.

McKinzie, "Fire Engineering: The Future of Artificial Intelligence in Firefighting" Oct. 25, 2018; available at <https://www.fireengineering.com/articles/2018/10/artificial-intelligence-firefighting.html>; 16 pages.

Patent Cooperation Treaty: International Search Report and Written Opinion for PCT/US2019/058635 dated Jan. 15, 2020; 14 pages.

Reis, et al., "Towards Reducing Cognitive Load and Enhancing Usability Through a Reduced Graphical User Interface for a Dynamic Geometry System: An Experimental Study" Proceedings—2012 IEEE International Symposium on Multimedia, ISM 2012. 445-450. 10.1109/ISM.2012.91; pp. 445-450 (2012).

Thomsen-Florenus, "Thermal Vision System" Berlin, Germany; Dec. 2017; 7 pages.

Wu et al., "Contract-Accumulated Histogram Equalization for Image Enhancement", IEEE SigPort, 2017. [Online], Available at <http://sigport.org/1837>.

Wu, "Feature-based Image Segmentation, Texture Synthesis and Hierarchical Visual Data Approximation" University of Illinois at Urbana-Champaign, Apr. 2006; 61 pages.

\* cited by examiner

WEARABLE ASSISTED PERCEPTION MODULE FOR NAVIGATION AND COMMUNICATION IN HAZARDOUS ENVIRONMENTS

CROSS-REFERENCE TO RELATED APPLICATIONS

This application claims the benefit of provisional Patent Application Ser. No. 62/892,926, filed Aug. 28, 2020, which is incorporated herein by reference.

TECHNICAL FIELD

Embodiments relate to a wearable assisted perception module for navigation and communication in hazardous environments that leverages the principles of neuroscience, real-world firefighting lessons learned, and the techniques of computer vision to elevate human performance in high stress environments.

BACKGROUND

In high stress and oftentimes hazardous work environments—including firefighting, search & rescue, oil and gas, surgery, aerial combat, mining, special ops, and the like—one false step has critical consequences, but so do too many slow steps. Go too fast and something life-threatening may be missed; go too slow and the results could be doubly devastating. The challenges of effectively and safely performing critical work in harsh and obscured environments have always existed. These challenges combine the physical strain imposed by hazardous terrain with the mental distress placed upon the individual operating within them. Critical human performance in high-stress environments is limited by how rapidly and effectively the brain can process impoverished or jumbled sensory inputs. Until now technology has been leveraged primarily to increase the amount of information provided to the senses, but not designed to specifically enhance the brain's existing (and unmatched) cognitive ability to make sense of that information.

For example, several emergency response systems are centered on the use of thermal imaging cameras (TICs) and augmented reality (AR) optics to provide a hands-free thermal display to the user. Current systems are typically carried by a crew member who must iteratively scan, mentally process and communicate what they perceive. Current handheld and hands-free TICs lack the computational resources and software required to unobtrusively offer advanced image processing and data visualization features to all crew members, inside and outside the hazardous environment, in real-time. This capability and time gap in the visual understanding of hazardous environments has been identified as a significant causative factor in responder line of duty deaths and injuries. Such systems cause crew members, such as first responders, to operate in a Stop, Look, Process and Remember paradigm, which is cumbersome and time consuming.

Accordingly, there is a need for improved methods and systems for effectively providing information to the senses of first responders operating in high-stress environments.

BRIEF SUMMARY

Disclosed embodiments describe an assisted perception module comprising an attachment mechanism to attach the assisted perception module to an outside of a helmet. A housing integrates modular components of the assisted perception module, and comprises a front portion and side portion. The front portion is located over an eye of a user. The modular components include one or more sensors located in either the front portion or the side portion to collect information about an environment as sensor data; one or more processors located in the side portion and coupled to the one or more sensors to execute one or more assisted perception engines that process the sensor data from the one or more sensors into enhanced characterization data. The output devices are located in the front portion to electronically communicate the enhanced characterization data to the user, wherein at least one of the one or more output devices protrudes from the front portion of the housing in front of the user's eye. In embodiments, the side portion can be located adjacent to sides or rear of the helmet, integrated with the helmet, worn by the user, or located remote from the user Another embodiment provides an assisted perception platform comprises one or more wireless assisted perception modules and a command and control interface displayed on a portable device. Each of the assisted perception modules comprises an attachment mechanism to attach the assisted perception module to different user helmet styles, makes, and models, and a housing mounted to the attachment mechanism. The housing integrates modular components comprising: a thermal imaging camera (TIC) carried by the user to collect thermal images of an incident as sensor data; a processor coupled to the TIC, wherein the processor executes one or more enhancement engines, including an edge enhancement engine to process the thermal images into enhanced characterization images that enhance edges of objects and declutters information in the thermal images; and a display device in a line of sight of the user to electronically receive the enhanced characterization images from the processor and to display the enhanced characterization images as augmented reality images. The command and control interface executes on a portable device located in proximity to the incident but remote from the one or more assisted perception modules. The command and control interface is in wireless communication with the one or more assisted perception modules through the portable device to enable a person of authority to manage the incident by receiving and displaying the enhanced characterization images from the one or more assisted perception modules, and by transmitting commands back to the one or more assisted perception module.

According to the methods and systems disclosed herein, a powered assisted perception module having a housing and an attachment mechanism for attaching the assisted perception to the outside of a helmet is provided for one or more variety of safety headgear. The disclosed embodiments provide an attachable helmet-worn accessory that is independent of a self-contained breathing apparatus (SCBA), for example, used by first responders. This side steps inherent difficulties in entering a tightly controlled, regulated, and economically mature domain. This will not require cooperation from the SCBA manufacturers nor entail lengthy certification cycles. Addressing first responder's impaired visibility, and creating a physical embodiment that avoids many market challenges, represents a new approach to accelerating innovation in this historically measured industry.

DETAILED DESCRIPTION

Figure 1:
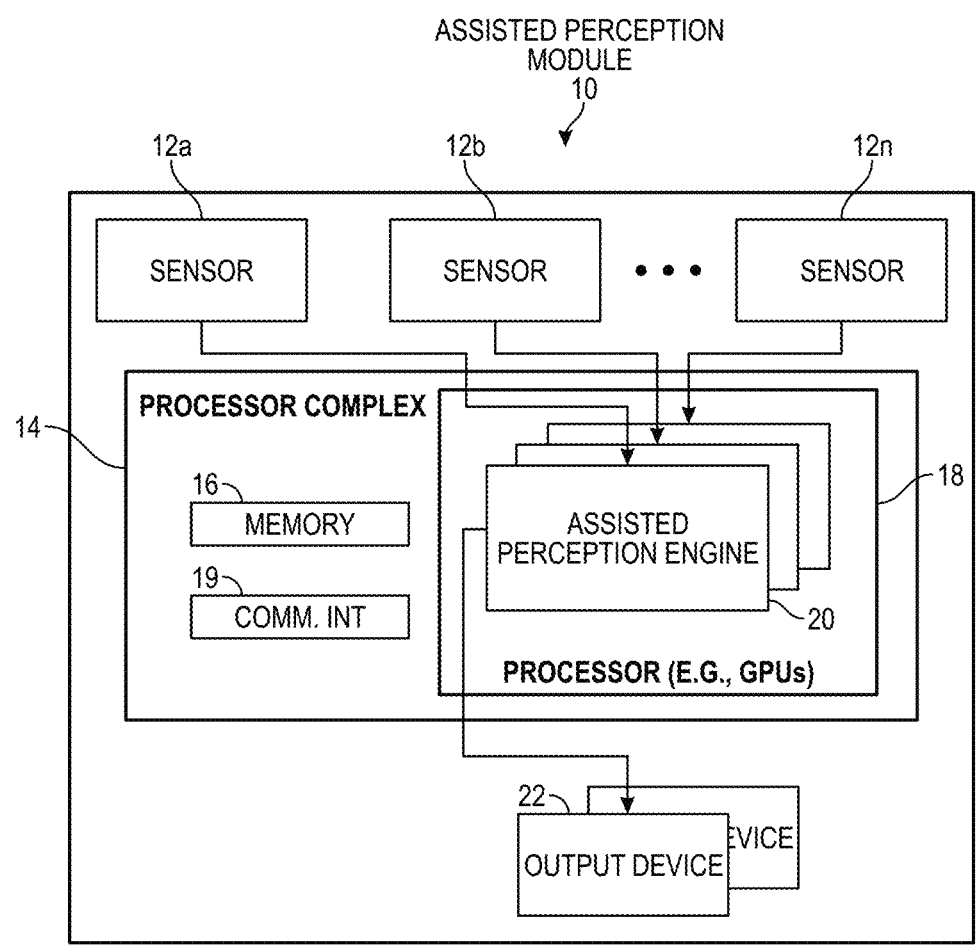
FIG. 1 is a diagram illustrating one embodiment of an assisted perception module according to one embodiment.

The exemplary embodiment relates to methods and systems for incorporating contextual and physiological visualizations into electronic communications via an assisted perception platform that may reduce the cognitive load of a user. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

In many critical, high-stress activities, such as firefighting, specialized tools have been developed to support challenging environments and critical objectives of crew members engaged in the high-stress activities. For the most part, these tools have evolved to support the crew members' physical needs—heat protection, airway protection, forcible entry, fire suppression, and the like. In the past 10-15 years, a greater focus has been placed on supporting the crew members' informational needs, including hazardous environment detection, communication, and safety alerting. For example, hearing aids, binoculars, and seismic sensors all increase the collection of information, but don't increase crew member's abilities to process or critically discern that extra information, or to effectively physically or vocally interact with multiple handheld devices. Polarized glasses, gas monitors, thermal imagers, and the like all refine and filter the collected information, but still do not address the time and stress penalty required to absorb and interpret all that information. This "more is better" approach is both distracting and inefficient. Handheld radios, helmet-worn recording cameras, and personal distress signal units (known as PASS Devices) make use of communication paradigms that involve manual interaction and potentially unclear or ambiguous interpretation. These type of tools call on cognitive and physical efforts to manipulate and interpret, reducing their efficacy as well.

Unfortunately, often times stress is the limiting factor to crew members successfully completing critical and dangerous activities. These are, by definition, high-stress environments and the difficulty in absorbing more and more information is made worse by stress. The health of the crew members is also compromised by stress, and regrettably contributes to a majority of crew member fatalities every year.

The exemplary embodiments provide a physically integrated platform that leverages the principles of neuroscience, real-world firefighting lessons learned, and the tools of computer vision to reduce assist the perceptions of the user, while reducing to elevate human performance in high stress environments. The principles of neuroscience are used to integrate sensor data into the natural senses in a manner that is optimized for the task at hand, e.g. search and rescue, and computer vision supplies the means in one embodiment. The physically integrated, multi-tasking optimized embodiment(s) leverages years of real-world firefighting experience, extreme exploration, user feedback, and user interface design, to minimize the physical impact, distraction, and ambiguity of device operation, through unique button placement, physical form/shape, and retractable components. Prior solutions increase the amount of information provided to the user's senses without specifically enhancing the brain's existing (and unmatched) cognitive ability to make sense of that information. The disclosed embodiments, in contrast, filter, summarize, and focus sensor data into enhanced characterization data comprising contextual and physiological visuals, audio and/or haptic cues to create a new category called "Assisted Perception" that significantly reduces complexity and cognitive load (and accompanying stress)—and decreases Time-To-Clarity required to save lives. According to embodiments, an assisted perception platform is provided that is designed to reduce risk, improve human safety, and save lives. The platform has shown game changing performance improvements of 267% (reducing the time to complete mission critical search and rescue tasks from 4.5 mins to 1.7 mins).

FIG. 1 is a diagram illustrating one embodiment of an assisted perception module according to one embodiment. In one embodiment, the assisted perception platform is a wearable electronic system worn on the head or body of a user when the user is engaged in complex, high stress environments that reduce cognitive abilities.

The assisted perception module 10 comprises, one or more sensors 12a-12n (collectively sensors 12) that collect and transmit information about an environment as rich sensor data. In one embodiment, the sensors are worn by the crew members. In another embodiment, other sensors may be in proximity to the crew members, such as on a drone equipped with a camera, gas detector, and the like. Example types of sensors may include, but are not limited to, a thermal imaging camera (TIC), a drone camera, a seismic sensor, a gas detector, a barometer, a thermometer, a pressure sensor, a spectrometer, a heart rate sensor, a blood pressure monitor, a GPS tracker, a speedometer, an accelerometer, and the like.

The device also includes a high-speed processor complex 14 coupled to the sensors 12. The high-speed processor complex 14 includes a memory 16, a communication interface 19, and one or more processors 18, such as graphics processor units (GPUs). The processor/GPUs 18 execute one more software-based assisted perception engines 20 to process the sensor data from the sensors 12 into enhanced characterization data that incorporates contextual and physiological visualizations. Powering the assisted perception module is one or more power sources (not shown) comprising a replaceable or rechargeable battery or batteries.

The assisted perception module 10 further includes one or more output devices 22 coupled to the processor complex 14 to electronically communicate the enhanced characterization data to the user such that the enhanced characterization data is integrated into natural senses of the user in a manner that is optimized for the performance of a specific task of the user to reduce the cognitive load of the user. In one embodiment, the output devices 22 may be implemented as a visual display, headphones and/or a haptic device. In one embodiment, the output device comprises a display device, which may be an augmented reality (AR) display or a heads-up display (HUD) viewport to display the enhanced characterization data.

The assisted perception module significantly enhances the crew member's or user's ability to make well informed decisions rapidly when operating in complex environments where cognitive abilities decline. A premise of the assisted perception module is that if thinking, operating, and understanding are easier for crew members, then crew members can achieve objectives more rapidly, spend less time in harsh conditions, and have potentially reduced stress levels because of the real-time assurance or reinforcement of a human sense, i.e., vision, hearing and or touch. Example users of the assisted perception module include, but are not limited to, firefighting, medical, military, law enforcement, search and rescue, utility services and other types of first responders.

The assisted perception module supports the introduction of life-saving, assisted perception solutions to high-stress environments. One example use of this new category of assistive technology is as a firefighting vision system. In this embodiment, the assisted perception module is a real-time computer vision engine designed to aid first responders as they navigate smoke filled, hazardous environments with little or no visible light. In this embodiment, the assisted perception module increases the speed and safety of first responders in the field with a focus upon navigation and visual communication applications. The assisted perception module dramatically enhances one's ability to make well informed decisions rapidly when operating in complex environments where cognitive abilities decline.

Figure 2A:
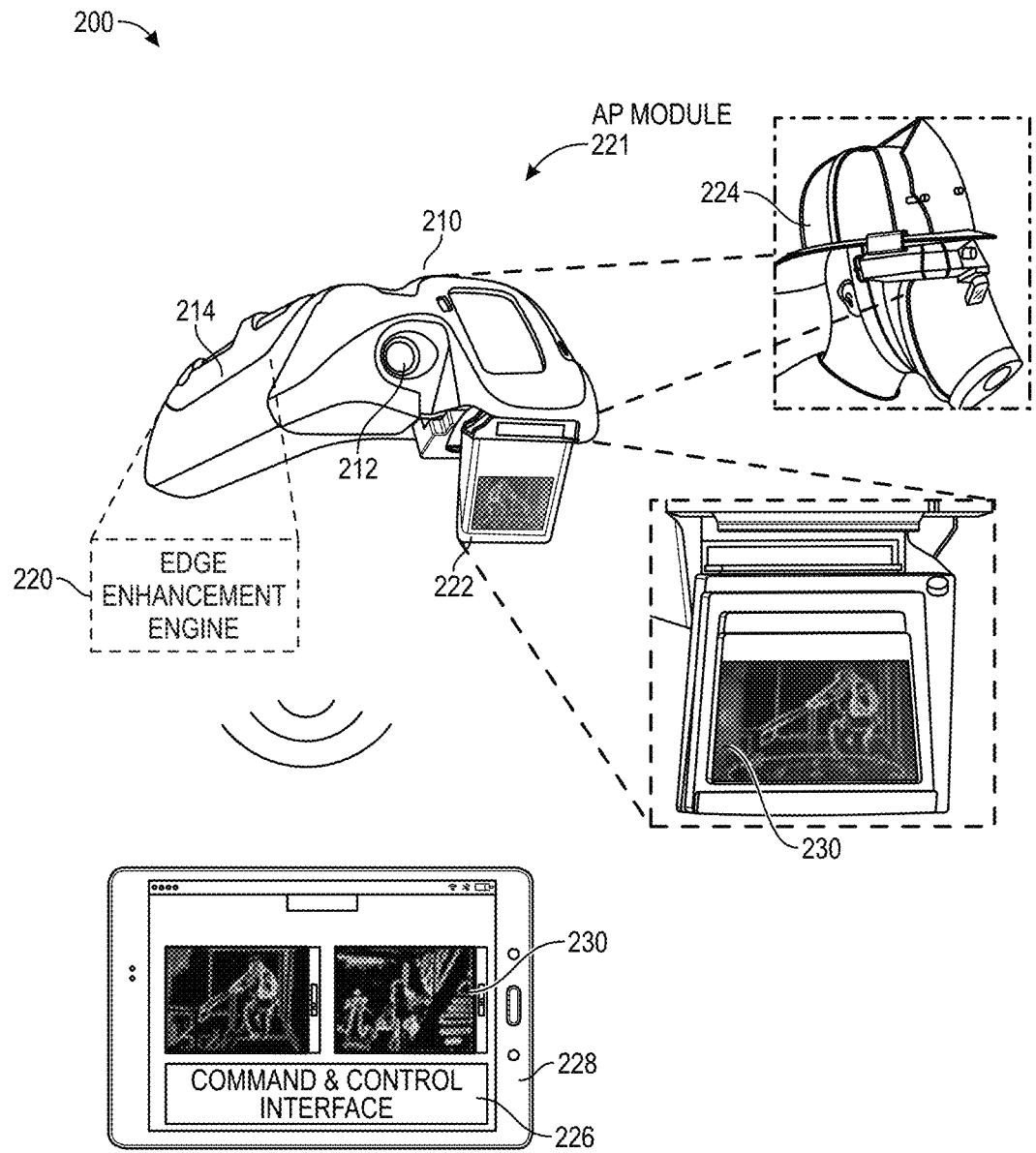
FIGS. 2A and 2B are diagrams illustrating modular components of the assisted perception platform in a first responder embodiment
Figure 2B:
Figure 2B:

FIGS. 2A and 2B are diagrams illustrating modular components of an assisted perception platform in a first responder embodiment. Referring to FIG. 2A, in one embodiment, the assisted perception platform 200 comprises two components: i) one or more assisted perception (AP) modules 221, each designed to attach to, or integrate with, the outside of a helmet 224 (and mask if any) worn by a user/crew member; and ii) a command and control interface 226 displayed on a display device 228 to a person of authority, such as an incident commander (IC), to manage the incident and the crew members wearing respective AP modules 221. As used herein the term helmet is intended to include safety headgear in general, particularly ones with a rigid brim capable of supporting at least a portion of the components comprising the AP modules, or ones having a rigid structure capable of integrating components of the AP modules.

In one of embodiment, each of the AP modules 221 is a wearable Internet of things (IOT) communication and navigation device comprising a modular set of components. In one embodiment, the modular set of components may include a thermal imaging camera (TIC) 212, a processor complex 214, and an augmented reality (AR) or HUD display 222. Compared to FIG. 1, the TIC 212 in FIG. 2A comprises a sensor 12 of the platform 200, the AR display 222 comprises an output device 22, and an edge enhancement engine 220 comprises an assisted perception engine 20 executed on the processor complex 214.

In one embodiment, the TIC 212, the processor complex 214, and the augmented reality (AR) display 222 are integrated into an enclosure or housing 210. The shape of the housing 210 may be optimized to maximize thermal and impact protection of the components, while supporting one-handed, "no look" operation. In embodiments, the housing 210 may be physically ruggedized, water and particle intrusion protected, and thermal-resistant, e.g., comprising an aerogel heat resistant material.

In operation, the TIC 212 captures thermal image data of obstacles and objects and sends the thermal image data to the processor complex 214. The processor complex 214 executes the edge enhancement engine 220, which generates enhanced AR wireframe images, i.e., enhanced images 230, by performing high speed processing on the thermal images to enhance the edges or outlines of objects and obstacles. The AR display 222 is positioned on the helmet 224 (e.g., along the brim) so that the AR display 222 is displayed in a field of view of the user. The AR wireframe images with enhanced outlines are projected on the AR display unit 222, as shown in the enlarged section of FIG. 2A. The processor complex 214 also wirelessly transmits the AR wireframe images to the command and control interface 226 on the display device 228 of the incident commander (IC).

FIG. 2B is a diagram illustrating example enhanced images 230 displayed on the AR display unit 222. The edge enhancement engine 220 provides a stream of visual formation that increases the luminosity and contrast of edges in the image to appear as a decluttered, enhanced cartoon image. The enhanced images 230 of the disclosed embodiments de-clutters raw TIC content by highlighting important shape and contour information for efficient structural assessment and navigation. The enhanced images 230 mitigates information overload by reducing the TIC content to the main geometric features of the hazard zone; this allows users to efficiently assess the layout of an environment in a single scan. In one embodiment, hot-spot labeling may be used in the images to draw the user's attention to thermal dynamics specific to higher heat. This represents a refinement between TIC-based measures of temperature, which have lead users astray in the field, and the value in alerting users to probable heat hazards. The user can select between these viewing modes at the press of a button. Thus, the enhanced images 230 increase the user's ability to make well-informed decisions rapidly when operating in complex environments where cognitive abilities decline, such as a first responder (e.g., fire fighter or search and rescue personnel). As shown, the AP module 221 enables the user to see in dark, smoke-filled environments. However, seeing through smoke is a side benefit to the value of the assisted perception platform 200, which is to reduce the visual complexity of hazardous environments, while allowing individuals to more easily make sense of their surroundings. The hazardous environments in which the AP module 221 may be worn include, but are not limited to, firefighting, law enforcement, confined spaces, hazmat, and utility services—basically any hazardous activity in which headgear or a helmet is worn.

Referring again to FIG. 2A, the processor complex 214 includes wireless components (e.g. Wi-Fi and cellular) that are used to create a shared experience between the users or crew members and the incident commander (IC) via the command and control interface 226. In embodiments, the portable device 228 of the IC is located in proximity to the incident but remote from the user. According to the present embodiment, the command and control interface 226 may be in wireless communication through the portable device 228 with a group of associated or paired AP modules 221 worn by users or crew members. Through the wireless components, each AP module 221 streams enhanced images to the command and control interface 226 on the display device 228 so that the IC can see in real time what the crew members see. The command and control interface 226 receives and displays the enhanced images from one or more of the assisted perception modules, and transmits commands back to the assisted perception modules 221. Thus, the assisted perception platform 200 improves situational awareness on the front lines as well as to create a shared operating picture with the IC on the backend through a cognitive load reducing command and control interface 226 that aggregates information and presents insights to the incident commander via a simplified GUI based on similar principals of neuroscience.

In one embodiment, the display device 228 comprises a tablet computer or large mobile phone, and the command and control interface 226 comprises multiple sub-panels or frames for displaying the streams from each of the AP modules 221 of the crew members (e.g., up to 8). First, all users of the AP module 221 at an incident scene are registered within a local network provided by wireless connectivity. A list of all local AP module users is visible to the incident commander (IC), who will then have an up-to-date roster of AP module-equipped users.

There are two communication modes. In the first communication mode, the incident commander (IC) can select any subpanel to engage in audio or visual icon based communication. In the second communication mode, the IC can broadcast to all of the AP module 221 equipped crew members in the field. In the first communication mode, the first step is for the command and control interface 226 to pull in the live video stream and data associated with each AP module 221 user. By streaming the live video stream of each AP module 221 user to their IC, the act of verbal communication is supplemented by a continuous stream of real-time visual information. This data allows the IC to not only see what their team members are seeing but also track them in real-time. Enabling the IC to see the live TIC video streams of their AP module 221 equipped personnel decreases the verbal communication burden placed upon their team members in harm's way. This means less traffic on push-to-talk radio channels. Less traffic on push-to-talk radio channels means this communication channel will be more reliable when it is needed most.

In the second communication mode, the IC can communicate back to the AP module 221 user through their AR display 222. This communication may be in the form of a set of visual symbols, text and/or icons presented on the AR display 222 and imparted with meaning through training. For example, the IC could broadcast a "Get Out!" alarm to all users at the press of a button. The IC could also navigate a particular user to the location of a victim or downed FR through the display of direction arrows, for example. The AP modules 221 may use high-performance GPUs and openGL (≥3.3) algorithms to render this interactive, multiple panel display.

It is important to note that in order to scale these valuable services to dozens of AP modules 221 users and several IC interfaces, important infrastructure must be included. This is because any tablet or laptop an IC might reasonably carry would not have sufficient computing power to display more than a few AP modules 221 user video streams. Moreover, if each AP modules 221 user were required to stream their video output to more than one IC, this would require costly data duplications on the AP modules 221 to transmit to each receiver. These considerations point toward a multicasting framework in which all AP modules 221 users transmit their data to a single server transceiver, which then handles all data copying and down-stream data routing. As an additional service, this server node may also archive all on-site data streamed wirelessly as well as receive all data stored on the AP modules 221 after the event during charging.

Traditional emergency response tools to aid the incident commander focus upon the incident commander's ability to integrate information unavailable to the crew members, and to then communicate these insights via radio channels. In contrast, the assisted perception platform 200 allows the incident commander to see the moment-to-moment visual experience of their crew members and to communicate back to them using visual cues displayed to crew members equipped with AP modules 221. Consequently, the connected nature of the platform (streaming visual data between AP modules 221 to a central command display device 228) elevates the safety of the entire workspace by providing a shared operating picture between individuals in the field and leaders monitoring workers from the periphery.

The assisted perception platform 200 is sensor agnostic and as any sensor can be added to the platform as long a corresponding assisted perception engine 20 is provided to process and present that sensor data. In one alternative embodiment, one or more of the TIC 212, the processor complex 214, and the augmented reality (AR) display unit 222 may be removably attached to the housing 210. In another alternative embodiment, the processor complex 214 may be located at a remote server and in wireless communication with the AP module 221 over a network, such as a 5G network. For instance, the processor complex 214 may be hosted on a remote server where sensor data of various types is sent from the AP modules 221 in the field. As an example, consider the use case where an assisted perception engine 20 is added to the processor complex 214 to process and present sensor data from a gas sensor. In this embodiment, a third party could push the gas sensor data into the assisted perception platform in the cloud where the output would be directly converted into a brain optimize visual format and displayed to the user on the AP display unit 222 or other output device 22. In another embodiment, the gas sensor data could be pushed to the assisted perception platform where the sensor data is processed by the corresponding assisted perception engine 20 in order to enhance the robustness of processed insights before delivering the insights to a user.

In a further embodiment, AP module may include both an onboard and cloud-based data collection systems deliver an ability to reconstruct an emergency incident after the fact, so that today's emergencies become tomorrow's training and advanced machine learning features. Lastly, this end-to-end visual communication system supplements push-to-talk radios by offering an additional intuitive communication channel between all users in low-visibility, high-stress environments.

Figure 3A:
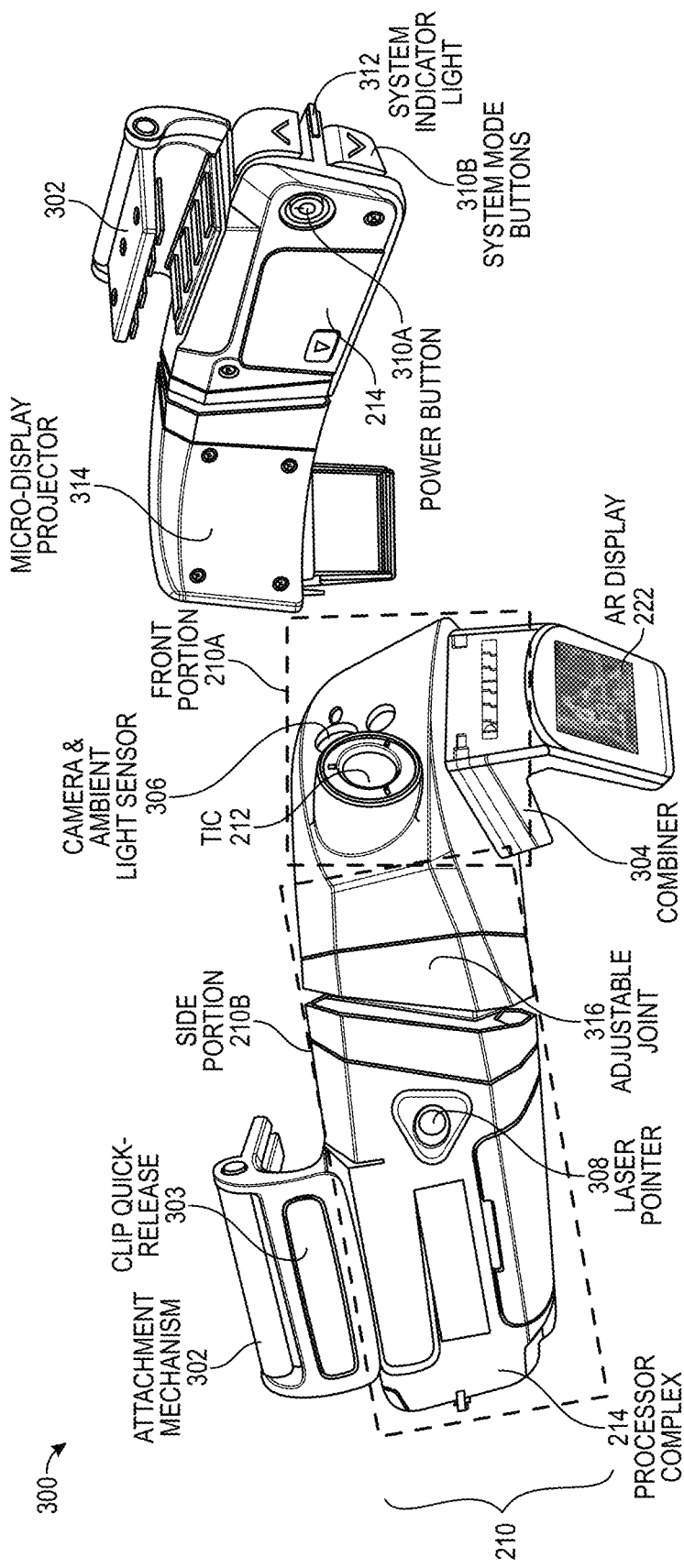
FIG. 3A is a diagram illustrating side and back views of the assisted perception module in one embodiment.

FIG. 3A is a diagram illustrating side and back views of the assisted perception module in one embodiment. The AP module 300 comprises a housing 210 and an attachment mechanism 302. The housing 210 integrates modular components including the TIC 212, the processor complex 214, the augmented reality (AR) display unit 222, and an attachment mechanism 302 for attaching the housing 210 to the helmet 224.

In one embodiment, the housing 210 comprises a front portion 210A and a side portion 210B, where the front portion 210A is located above a user's eye. In one embodiment, the side portion 210B is located adjacent to sides or rear of the helmet or integrated therewith. In other embodiments, the side portion 210B may be worn on the user. In yet another embodiment, the side portion 2108 may be located remote from the user (e.g. a remote server) and wirelessly communicates with the front portion 210A.

In one embodiment, the TIC 212, the AR display unit 222, an electrical-mechanical combiner 304, and a camera and ambient light sensor 306 may be located in the front portion 210A of the housing 210. The TIC 212, the AR display unit 222, and a camera and ambient light sensor 306 each face in a direction of the user's gaze. When the AP module 300 is worn on the helmet of a user, the AR display unit 222 protrudes from the front portion 210A in front of the user's eye. In the embodiment shown, the AR display unit 222 protrudes from the top, but in other embodiments, the AR display unit 222 may protrude from the sides or bottom. In another embodiment, the TIC 212 may be located in the side portion 210B.

According to one aspect of the disclosed embodiments, the display unit 222 may be movable into and out of the user's field of view, through an integrated retraction mechanism. In one embodiment the protraction mechanism may comprise an electrical-mechanical combiner 304 that mechanically rotates the top side of the AR display unit 222 about an axis to move the AR display unit 222 in and out of the user's line of sight. The enhanced AR images are projected onto the AR display unit 222 by a micro display projector 314 located within the front portion 210A. The retraction mechanism allows the user to engage the device with a simple movement or set of movements, and make use of it in a hands-free manner. This embodiment also adds a distinctive "fighter jet" style to the device and reinforces the unobtrusive, less-is-more design philosophy.

The side portion 210B of the housing 210 may contain the processor complex 214 and other electrical components. When worn by the user, the side portion 210B is located adjacent to sides or rear of the helmet 224 The exterior of the side portion 210B 210 may include a laser pointer 308, a power button 310A, one or more system mode buttons 310B and a systems indicator light 312. The optional integrated laser pointer 308 (or LED indicator beacons) may assist with device status observation, navigation, non-verbal communication, and locating a user in distress. Buttons 310A and 310B are collectively referred to herein as operations buttons 310. In embodiments, the side portion 210B may comprise a single piece of material or two or more separate pieces of material. In the embodiment shown, side portion comprises two pieces of material separated by an adjustable joint 316 that the wearer may manipulate so that the front portion 210A and the side portion 210B fit more closely to the contours of the helmet brim. In one embodiment, the buttons 310 may be located on a top surface/side of the side portion 210B. In one embodiment, the power button 310A may be located on a backside of the side portion 2108 to prevent inadvertent turning on or off of the device.

The attachment mechanism 302 is physically located on either the top or bottom of the side portion 210B or formed as part of housing 210 itself to attach the AP module 300 to the helmet 224. In the embodiment shown, the attachment mechanism 302 comprises a clip that is placed in a clamped position onto the brim of the helmet 224 to removably attach the AP module 300 to the helmet 224. In one embodiment, the helmet clip 302 includes a clip quick release 303, which when pressed by the user, opens the helmet clip 302 to release the AP module 300 from the helmet 224. In one embodiment, the attachment mechanism 302 comprises a modular clip that allows the assisted perception module to be readily attached and removed to many different helmets of differing sizes, makes, models, etc. For example, one part of the clip may be rigidly attached to the helmet and the other part removably attached to the assisted perception module 300, with the two parts attaching via a slide-in rail. This modular clip may customized to fit various helmet sizes, makes, and models, while providing a standardized rigid mounting point for the assisted perception module.

However, any type of attachment mechanism 302 or mount may be used to attach to the AP module 300 the helmet of a user, including, but not limited to, a spring-loaded connector, and a built-in flexible compliant hinge or groove, for instance. The spring-loaded connector may include a spring or friction secured horizontal slide-in alignment mechanism, and provision for field adjustment of final position/angle of device. Compliant hinges/mechanisms are those that do not use a multi-part hinge but rather use flexible hinge mechanisms that take advantage of material properties to form the hinge. Alternatively, the AP module 300 may be attached clothing or body of the user, by for example, a shoulder mount.

The TIC 212 may be located in either the front portion 210A (as shown) or the in the side portion 210B of the housing 210 so long as the TIC 212 points in the direction of the user's gaze. In one embodiment, the front portion 210A and the side portion 210B of the housing 210 may be orthogonal to one another, e.g., generally at a right angle to each other (e.g., within 0°-20°). In another embodiment, the housing 210 is curved along a backside of the front portion 210A as well as at the intersection where the front portion 210A meets the side portion 210B, such that the overall curvature of the housing 210 approximates the curvature of a brim or edge of the helmet 224.

Figure 3B:
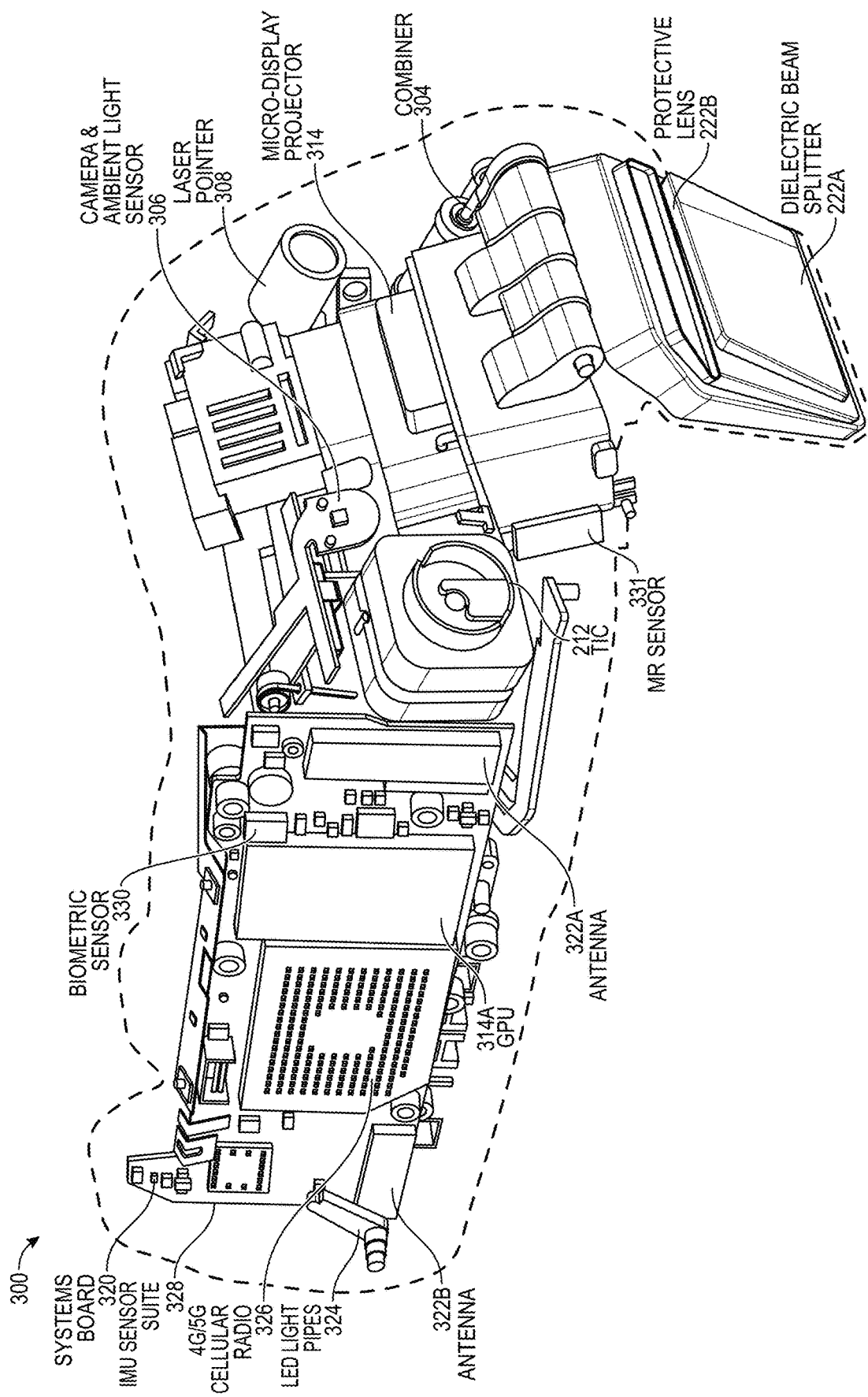
FIG. 3B is a diagram illustrating a front and side view of the modular the AP module without the housing to show additional components and wireless capabilities.

FIG. 3B is a diagram illustrating a front and side view of the modular the AP module 300 without the housing to show additional components and wireless capabilities. Referring to both FIGS. 3A and 3B, in one embodiment, the side portion 210B of the housing 210 houses the processor complex 214 on a systems board 320. In one embodiment, the systems board 320 is located in the side portion 210B in vertical orientation. Therefore, the side portion 210B also has vertical orientation, referred to herein as a "shark fin," which provides the user with a physical registration point and button placement based on where a gloved hand would rest.

In one embodiment, the processor complex 214 is located on one side of the systems board 320 and may include any combination of: antennas 322A and 322B, GPU 214A, LED light pipes 324, 4G/5G cellular radio 326, inertial measurement unit (IMU) sensor suite 328, and biometric sensor 330. The IMU sensor suite 328 may include GPS and a barometer for example. The IMU sensor suite 328 allows the device to not only monitor the movements of the user but also identify their behavioral state and location, such as determining if the user running or stopped. By including GPS, the user may be located in a global frame common to all users. The barometer improves GPS performance by estimating relative changes in elevation while also providing a means for detecting rapid changes in fire dynamics. The camera and ambient light sensor 306 enables the AP module 300 to adjust the brightness of its AR display 222 as the user moves between bright and low-visibility environments. The biometric sensor 330 may be used to monitor one or more physical or physiological parameters or states of the user.

In one embodiment, antenna 322A and antenna 322B are cellular antennas and work in conjunction with the 4G/5G cellular radio 326 and together broadcast the video stream of enhanced images and other data.

In one embodiment, the location position of a frame of the combiner 304 is determined through the use of small magnets embedded into the frame, which are sensed using a magnetic resistance (MR) sensor 331. This allows the system to provide feedback on the position and functionality of the AR display 222.

The remaining components are as shown in FIG. 3A except that the AR display 222 is shown comprising a dielectric beam splitter 222A covered by a protective lens 222B. The TIC 212 captures thermal image data of obstacles and objects and sends the thermal image data via a cable (not shown) to the GPU 214A. The GPU 214A processes the thermal image data into the enhanced images and the enhanced images are sent to the micro-display projector 314 projection onto the dielectric beam splitter 222A directly in front of the user's eye.

Figure 3C:
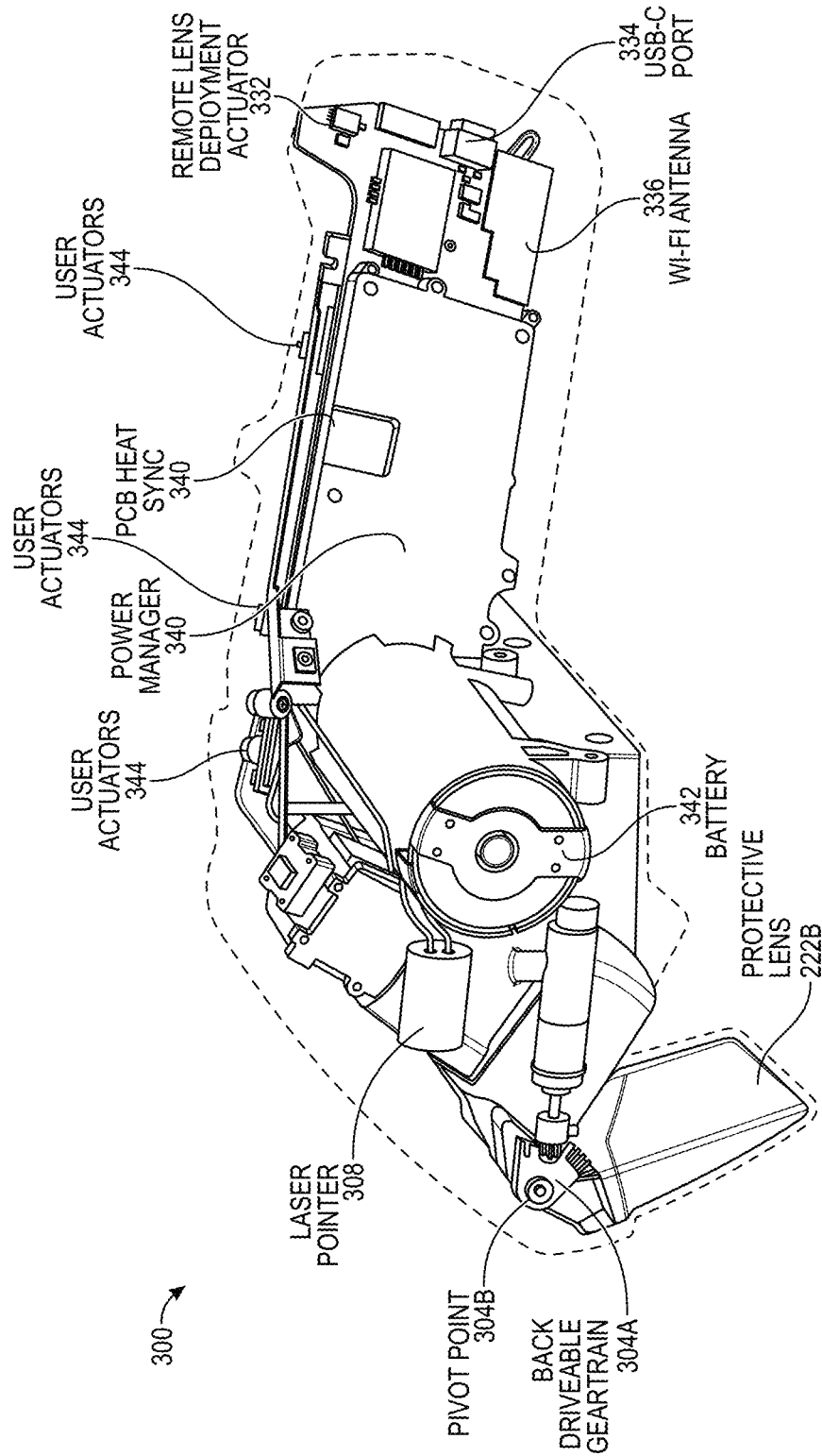
FIG. 3C is a diagram illustrating a back and opposite side view of the AP module without the housing.

FIG. 3C is a diagram illustrating a back and opposite side view of the AP module 300 without the housing. Referring to FIGS. 3A-3C, a backside of the systems board 320 may include a remote lens deployment actuator 332, a USB-C port 334, a Wi-Fi antenna 336, a PCB heat sync 338 and a power manager 340. The AP module 300 further includes a battery 342 to supply power to all of the electrical components. In an embodiment, the battery 342 may comprise a rechargeable lithium phosphate battery and is recharged through the USB-C port 334 or other charging mechanism. The Wi-Fi antenna 336 may transmit the enhanced images from the AP module 300 to the command and control interface 226 (FIG. 2A). The electrical-mechanical combiner 304 includes a back-drivable geartrain 304A that rotates the protective lens 22B and the dielectric beam splitter 222A up and down about pivot point 304B. The user actuators 344 are electrical and/or electro-mechanical buttons that allow the user to control and interact with the system with one hand while grasping the rim of the helmet. The location and spacing of the buttons are placed so that the user is able to locate them without looking and by sense of feel through heavy gloves. This is accomplished through the use of raised physical registration locators and the angles and spacing of the buttons themselves. Note the embodiment shown in FIGS. 3B and 3C are different from the embodiment shown in FIG. 3A in that the in FIG. 3A, the buttons 310 are not shown located on the top of the side portion 210B.

Figure 4A:
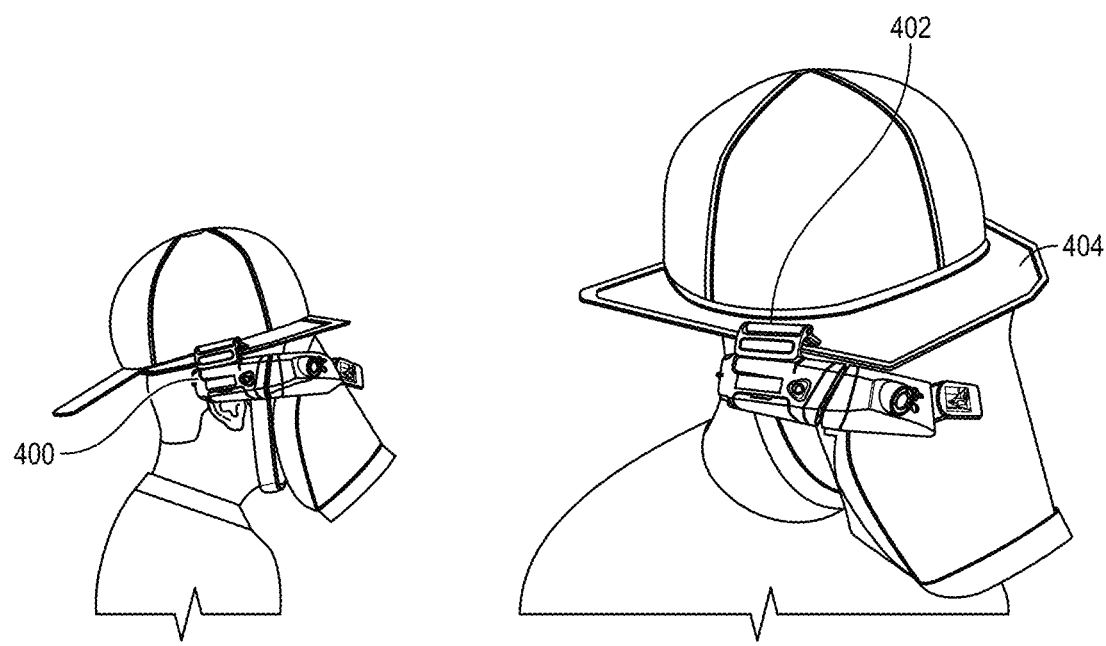
FIGS. 4A and 4B illustrate a side under mounting configuration.
Figure 4B:
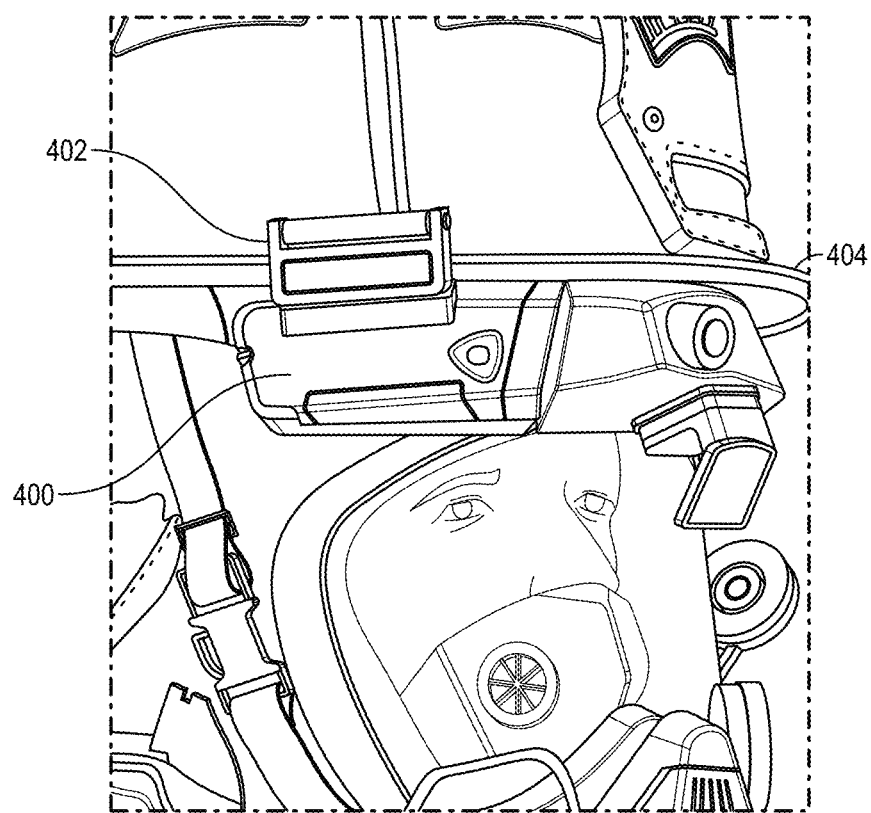

FIGS. 4A-4E are diagrams illustrating various options for mounting the assisted perception module to a helmet. FIGS. 4A and 4B illustrate a side under mounting configuration. In the side under mounting configuration, the AP module 400 has a top mounted helmet clip 402 that is clamped to a side of the helmet brim 404, which position the AP module 400 under the helmet brim 404. The side under mounting configuration protects the AP module 400 from directional heat and impacts by hiding the assist perception module 400 under the brim.

In an alternative embodiment, the housing of the AP module 400 may include an attachment system (not shown) that enables the user to slide the front portion of the housing backwards into a side-mounted clip portion through an articulating rail. This embodiment allows the AP module to removably attach to the user's helmet, while achieving a repeatable alignment and customized positioning for each user.

Figure 4C:
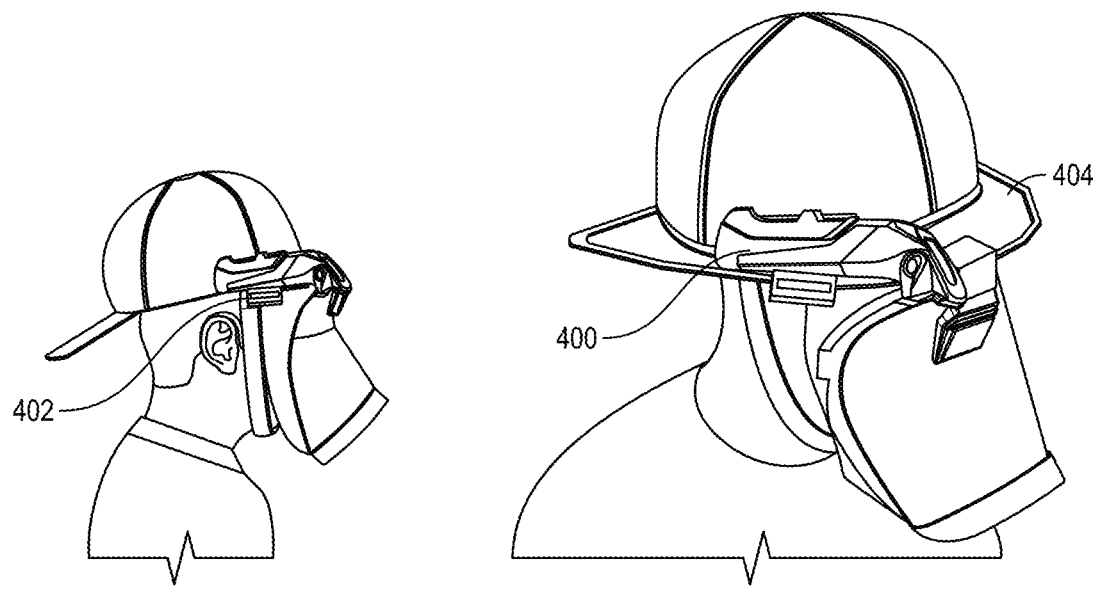
FIGS. 4C and 4D illustrate a top mounting configuration in one embodiment.
Figure 4D:
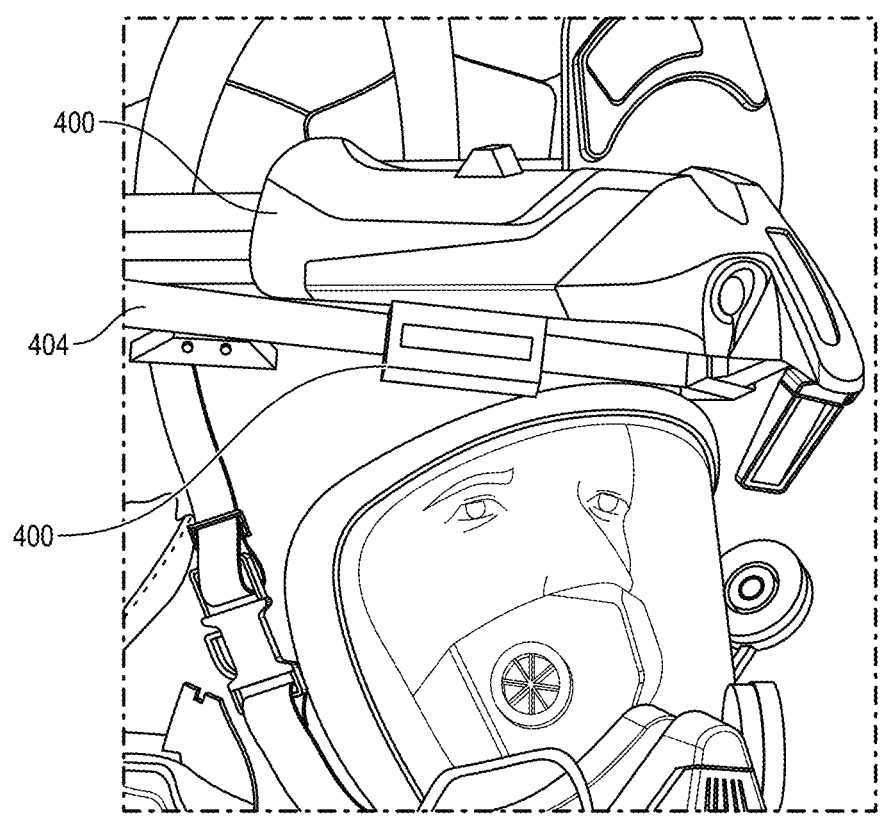

FIGS. 4C and 4D illustrate a top mounting configuration in one embodiment. In the top mounting configuration, the AP module 400 has a bottom mounted helmet clip 402 that is clamped to a side of the helmet brim 404, which position the AP module 400 on top of the helmet brim 404. In this embodiment, the housing of the AP module 400 may physically rest on top of the helmet brim 404 for additional support. In embodiments, the top mounting configuration keeps the AP module 400 close to the center of balance near the spider straps (within the headband of the helmet) that suspends the helmet on the user's head. This allows room to make the AR display 222 to flip up in case the user wants it out of the way.

FIGS. 4E-4H illustrate a top mounting configuration in another embodiment. In this top mounting configuration, the attachment mechanism is a modular clip comprising a horizontal slide-in rail in which a module clip 420 on the assisted perception module 400 slides over a helmet clip 422 rigidly attached on the helmet 424.

Figure 4E:
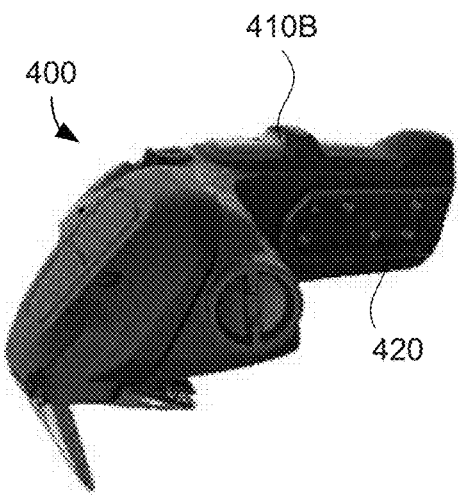
FIGS. 4E-4H illustrate a top mounting configuration in another embodiment.
Figure 4F:
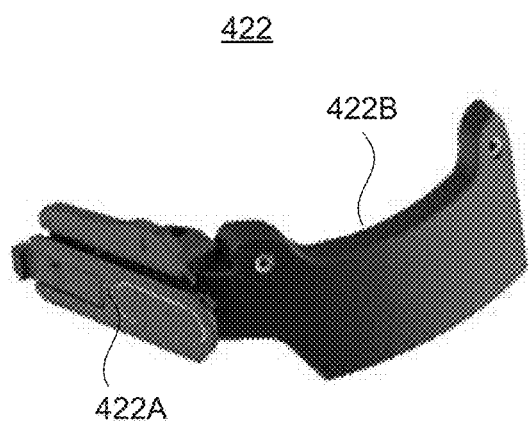
Figure 4G:
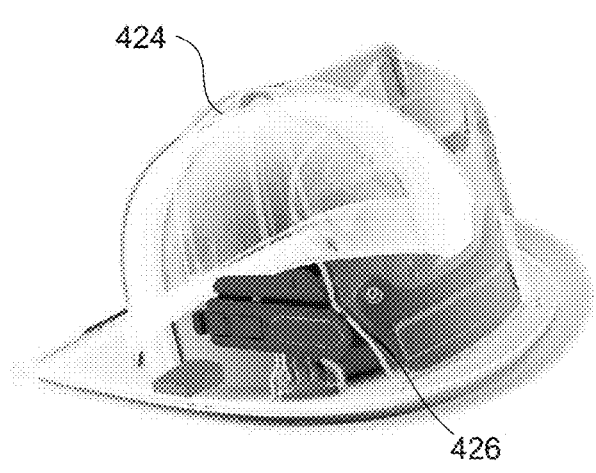
Figure 4H:
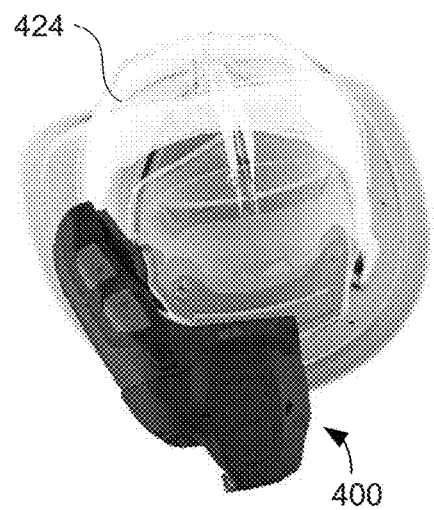

FIG. 4E shows the module clip 420A may be removably attached to a backside of the side portion 410B of the housing of the assisted perception module 400. FIG. 4F shows the helmet clip 422 includes a horizontal clip 422A affixed to a curved body 422B, which is to attach to the helmet 424 through fasteners (e.g., screws), but can still be removed/replaced. FIGS. 4G and 4H show that the curved body 422B of the helmet clip 422 mounts to existing hard attachment points behind a helmet shield 226 such that the horizontal clip 422A is exposed for attachment with the module clip 420 on the assisted perception module 400. In one embodiment, the module clip 420 and the helmet clip 422 attach via a horizontal slide mechanism or slide-in rail, where the module clip 420 slides over the helmet clip 422 and locks into place.

The assisted perception module in this embodiment sits on/above the brim of the helmet 424. The modular clip 222 may be customized to fit various helmet sizes, makes, and models, while providing a standardized rigid mounting point for the assisted perception module. In one embodiment, the horizontal clip 422 includes provisions for the user to adjust the vertical, horizontal, and angle positioning of the assisted perception module 400, allowing it to be quickly mounted to a pre-adjusted position.

According to a further aspect of this embodiment, the helmet clip 422 includes an embedded Near Field Communications (NFC) device, such as an RFID tag, that is readable by the assisted perception module 400. This provides serialization and registration of the assisted perception module 400 to the user's helmet, identifying both the particular helmet 424 and the user.

Figure 4I:
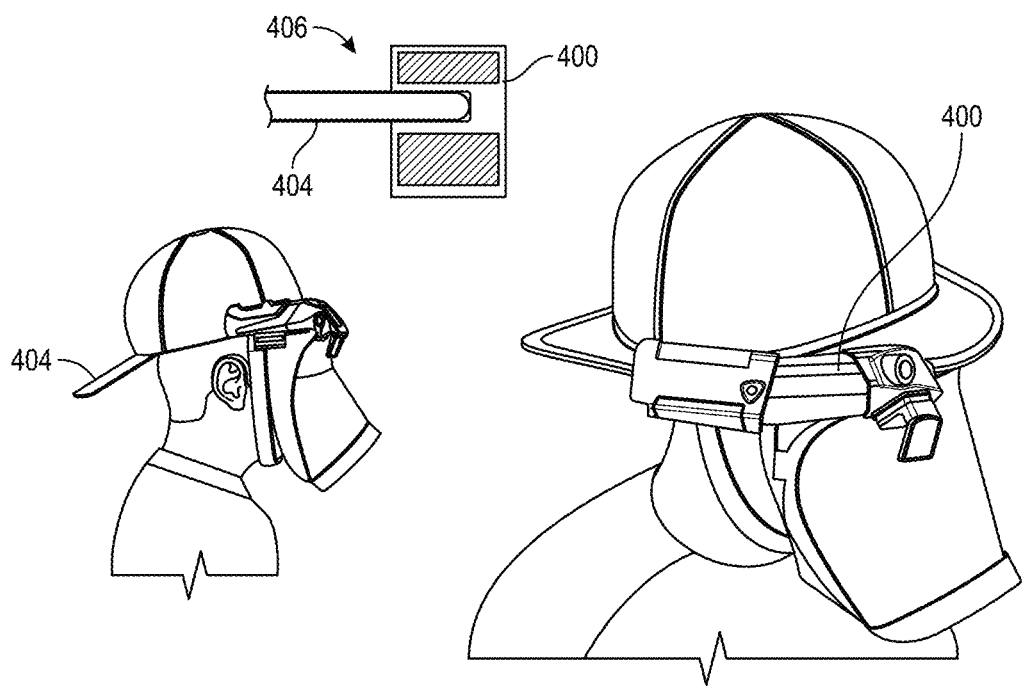
FIG. 4I illustrates a groove mounting configuration.

FIG. 4I illustrates a groove mounting configuration. In the groove mounting configuration, the housing of the AP module 400 is formed with a flexible complaint groove 406 built within the side of the housing facing the helmet brim 404. The groove 406 has thickness approximately equal to the thickness of the helmet brim 404 so that the AP module 400 attaches to the helmet by sliding the groove over the helmet brim 404. This embodiment enables the housing itself to act a large clip that contains the components of the AP module 400. Components that require protection can be positioned within a bottom portion of the housing that is located beneath the brim when attached. Less important components or cables can be positioned within an upper portion of the housing located over the brim and more exposed.

The assisted perception platform 200 provides an attachable helmet-worn accessory that is independent of a first responder's SCBA. This side steps inherent difficulties in entering a tightly controlled, regulated, and economically mature domain. This will not require cooperation from the SCBA manufacturers nor entail lengthy certification cycles. Addressing first responder's impaired visibility, and creating a physical embodiment that avoids many market challenges, represents a new approach to accelerating innovation in this historically measured industry.

Figure 5:
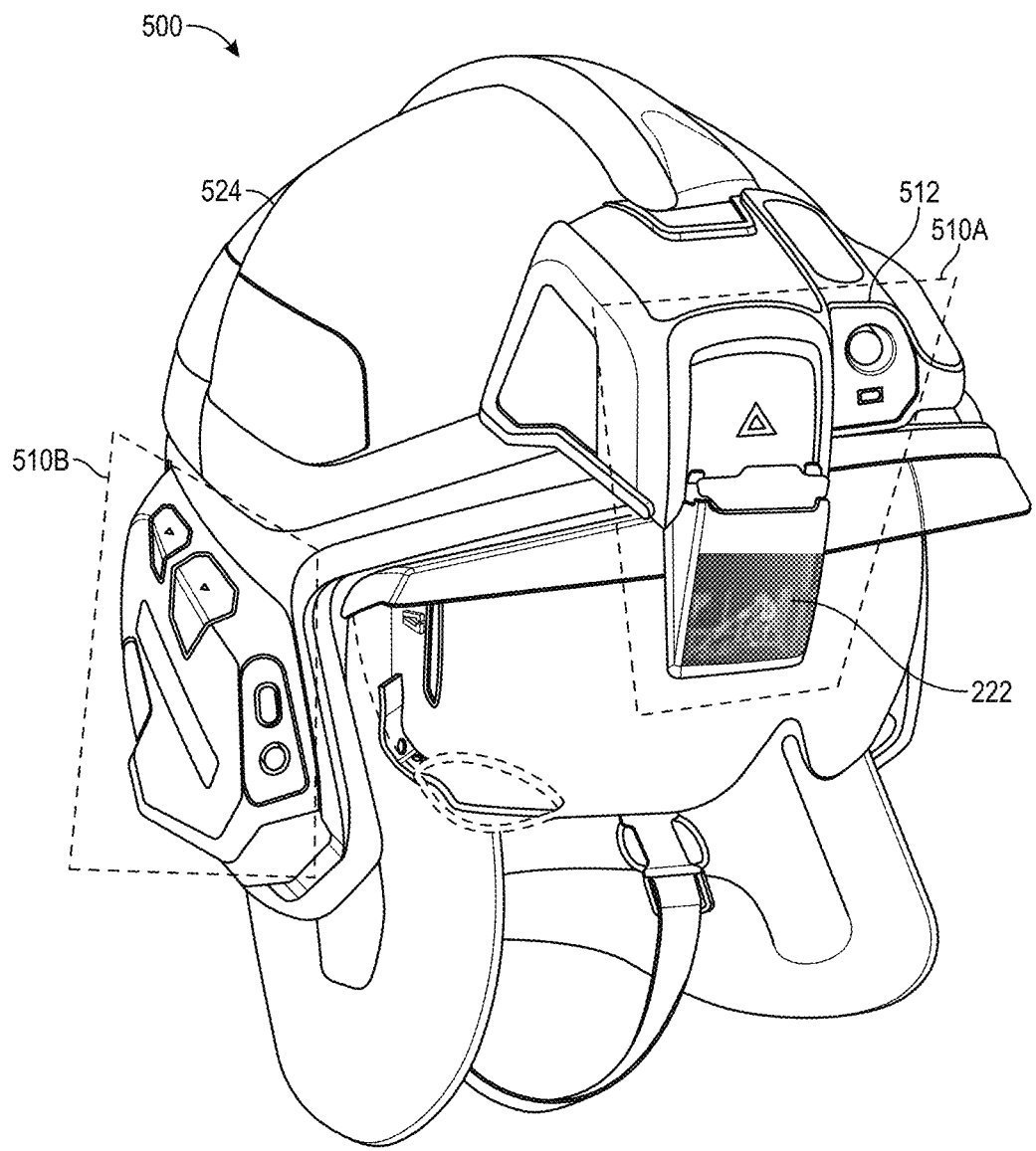
FIG. 5 is a diagram illustrating an example of an AP module in which the attachment mechanism comprises a physical integration on a helmet.

However, FIG. 5 is a diagram illustrating an example of an AP module 500 in which the attachment mechanism comprises a physical integration on the helmet. In this embodiment, components of the AP module 500 are separated into two portions, a front portion 510A and a side portion 510B. The front portion 510A is integrated with a front of the helmet 524 and contains the TIC 512 where the AR display 222 protrudes into the field of view of the user. The side portion 510B is integrated with a side of the helmet 524 and contains remaining components of the AP module 500, such as the processor complex 214, buttons and laser pointer.

The AP platform disclosed herein provides users, such as firefighters (FRs), with a solution that is more natural to the way humans see and operate under stress, while also enabling them to communicate with their IC and fellow crew members in a new way. By combining the principles of neuroscience with cutting edge user experience design, the AP module minimizes the disorientation and confusion associated with these hazard zones by offering a suite of intuitive imaging, navigation and visual communication applications. In one embodiment, the AP module does this by combining augmented reality (AR), TICs, wireless network technologies, camera tracking, GPS localization and data collection. The use of AR images provide a more natural viewing experience. By presenting the live AR video feed in the FRs line-of-sight in darkness or smoke, AR images are presented where FRs want it, when they want it. A cellular communications backhaul enables a shared experience between the FR and their IC: IC sees what their FRs see. This changes the model of TIC use from the cumbersome Stop, Look, Act and Remember paradigm to a state of continuous assisted perception for all personnel. It provides the IC with high-resolution location and hazard data, and it aids the FR wearing C-THRU to navigate safely and efficiently.

A wearable assisted perception module for navigation and communication in hazardous environments has been disclosed. The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Software written according to the present invention is stored in some form of computer-readable medium such as a memory, a hard disk, or optical disk and executed by a processor. Accordingly, many modifications may be made by one of ordinary skill in the art without departing from the spirit and scope of the appended claims.

We claim:

1. An assisted perception module, comprising:
   an attachment mechanism to attach the assisted perception module to an outside of a helmet;
   a housing to integrate modular components of the assisted perception module, the housing comprising a front portion and side portion, wherein the front portion is located over an eye of a user, the modular components including:
      one or more sensors located in either the front portion or the side portion to collect information about an environment as sensor data;
      one or more processors located in the side portion and coupled to the one or more sensors, wherein the one or more processors execute one or more assisted perception engines that process the sensor data from the one or more sensors into enhanced characterization data;
      one or more output devices located in the front portion, at least one of the one or more output devices configured to electronically communicate the enhanced characterization data to the user, wherein at least one of the one or more output devices protrudes from the front portion of the housing in front of the user's eye; and
      one or more buttons spaced to allow interaction with a gloved hand, at least one of the one or more buttons configured to enable a selection between two or more viewing modes, at least one of the two or more viewing modes configured to cause an enhanced characterization image generated from the enhanced characterization data to be displayed on the at least one of the one or more output devices, the enhanced characterization image comprising reduced and enhanced thermal image content representing a thermal image from the one or more sensors reduced to one or more main geometric features of an object with enhanced edges of the object.

2. The assisted perception module of claim 1, wherein the attachment mechanism comprises a clip that is placed in a clamped position onto a brim of the helmet to removably attach the assisted perception module to the helmet.

3. The assisted perception module of claim 1, wherein the attachment mechanism comprises a spring-loaded connector.

4. The assisted perception module of claim 1, wherein the attachment mechanism is mounted to a top of the assisted perception module in a side under mounting configuration such that the assisted perception module is positioned under a brim of the helmet.

5. The assisted perception module of claim 1, wherein the attachment mechanism is mounted to a bottom of the assisted perception module in a top mounting configuration such that the assisted perception module is positioned on top of a brim of the helmet.

6. The assisted perception module of claim 1, wherein the attachment mechanism comprises a flexible compliant groove built into the housing and the assisted perception module attaches to the helmet by the groove sliding over a brim of the helmet.

7. The assisted perception module of claim 1, wherein the attachment mechanism comprises a horizontal slide-in rail in which a module clip on the assisted perception module slides over a helmet clip rigidly attached on the helmet.

8. The assisted perception module of claim 1, wherein the attachment mechanism comprises a physical integration on the helmet, wherein the front portion of the housing is integrated with a front of the helmet and contains the one or more sensors and the at least one of the one or more output devices.

9. The assisted perception module of claim 1, wherein the one or more sensors capture sensor data, the one or more sensors comprising at least one of: a thermal imaging camera (TIC), a camera, a seismic sensor, a gas detector, a barometer, a thermometer, a pressure sensor, a spectrometer, a heart rate sensor, a blood pressure monitor, a GPS tracker, a speedometer, and an accelerometer, wherein the one or more assisted perception engines generate enhanced data from the sensor data, and wherein the at least one of the one or more output devices comprises an augmented reality (AR) or head up (HUD) display to display the enhanced data to the user.

10. The assisted perception module of claim 1, further comprising an integrated electro-mechanical retraction mechanism that moves the at least one of the one or more output devices into and out of the user's field of view.

11. The assisted perception module of claim 1, wherein the side portion is one of: located adjacent to side or rear of the helmet, integrated with the helmet, worn by the user, or located remote from the user.

12. An assisted perception platform, comprising:
one or more wireless assisted perception modules, each of the one or more assisted perception modules comprising:
 an attachment mechanism to attach the assisted perception module to different user helmet styles, makes, and models;
 a housing mounted to the attachment mechanism, the housing to integrate modular components comprising:
  a thermal imaging camera (TIC) carried by the user to collect thermal images of an incident;
  a processor coupled to the TIC, wherein the processor executes one or more assisted perception engines, including an edge enhancement engine to process the thermal images into enhanced characterization images comprising reduced and enhanced thermal image content representing one or more of the thermal images reduced to one or more main geometric features of an object with enhanced edges of the object; and
  a display device in a line of sight of the user to electronically receive the enhanced characterization images from the processor and to display the enhanced characterization images as augmented reality images;
 one or more buttons spaced to allow interaction with a gloved hand, at least one of the one or more buttons configured to enable a selection between two or more viewing modes, at least one of the two or more viewing modes configured to cause the enhanced characterization images to be displayed on the display device; and
 a command and control interface displayed on a portable device located in proximity to the incident but remote from the one or more assisted perception modules, the command and control interface in wireless communication with the one or more assisted perception modules through the portable device to enable a person of authority to manage the incident by receiving and displaying the enhanced characterization images from the one or more assisted perception modules, and by transmitting commands back to the one or more assisted perception modules, the commands comprising one, or a combination, of a visual symbol, text, and icon imparted with meaning through training.

13. The assisted perception platform of claim 12, wherein the one or more wireless assisted perception modules include a near-filed communication device (NFC) to uniquely identify each helmet.

14. The assisted perception platform of claim 12, wherein the attachment mechanism comprises a clip that is placed in a clamped position onto a brim of the helmet to removably attach the assisted perception module to the helmet.

15. The assisted perception platform of claim 12, wherein the attachment mechanism comprises a spring-loaded connector.

16. The assisted perception platform of claim 12, wherein the attachment mechanism is mounted to a top of the assisted perception module in a side under mounting configuration such that the assisted perception module is positioned under a brim of the helmet.

17. The assisted perception platform of claim 12, wherein the attachment mechanism is mounted to a bottom of the assisted perception module in a top mounting configuration such that the assisted perception module is positioned on top of a brim of the helmet.

18. The assisted perception platform of claim 12, wherein the attachment mechanism comprises a flexible compliant groove built into the housing and the assisted perception module attaches to the helmet by the groove sliding over a brim of the helmet.

19. The assisted perception platform of claim 12, wherein the attachment mechanism comprises a horizontal slide-in rail configured to attach the assisted perception module directly to a rigidly attached clip on the user's helmet.

20. The assisted perception platform of claim 12, wherein the attachment mechanism comprises a physical integration on the helmet, wherein a front portion of the housing is integrated with a front of the helmet and contains the one or more sensors and the AR display.

21. The assisted perception platform of claim 12, further comprising an integrated retraction mechanism that moves the display device into and out of the user's field of view.

22. A method of implementing an assisted perception module, comprising:
attaching, through an attachment mechanism, the assisted perception module to a helmet; and
integrating modular components of the assisted perception module within a housing, the housing comprising a front portion and side portion, wherein the front portion is located over an eye of a user and the side portion is located adjacent to sides or rear of the helmet, or integrated therewith, the module components including:
 one or more sensors located in either the front portion or the side portion to collect information about an environment as sensor data;
 one or more processors located in the side portion and coupled to the one or more sensors, wherein the one or more processors execute one or more enhancement engines that process the sensor data from the one or more sensors into enhanced characterization data;
 one or more output devices located in the front portion to electronically communicate the enhanced characterization data to the user, wherein at least one of the one or more output devices protrudes from the front portion of the housing in front of the user's eye; and one or more buttons spaced to allow interaction with a gloved hand, at least one of the one or more buttons configured to enable a selection between two or more viewing modes, at least one of the two or more viewing modes configured to cause an enhanced characterization image generated from the enhanced characterization data to be displayed on the at least one of the one or more output devices, the enhanced characterization image comprising reduced and enhanced thermal image content representing a thermal image from the one or more sensors reduced to one or more main geometric features of an object with enhanced edges of the object.

23. The method of claim 22, further comprising mounting the attachment mechanism to the respective elements by at least one of:

a side under mounting configuration such that the assisted perception module is positioned under a brim of the respective helmets;

a top mounting configuration such that the assisted perception module is positioned on top of the brim of the respective helmets;

a horizontal slide-in rail in which a module clip on the assisted perception module slides over a helmet clip rigidly attached on the helmet;

a flexible compliant groove configuration, the groove built into the housing such that the groove slides over the brim of the respective helmets physically integrating the front portion of the housing with a front of the helmet, and wherein the side portion of the housing is either integrated with the helmet, worn by the user, or located remote from the user.

24. The method of claim 23, further comprising implementing the housing with a heat resistant material and providing the assisted perception module with a rechargeable battery, a USB port, and a laser pointer.

* * * * *